May 19, 1936.　　W. H. CARRIER ET AL　　2,041,045
REFRIGERATION
Filed Oct. 27, 1933
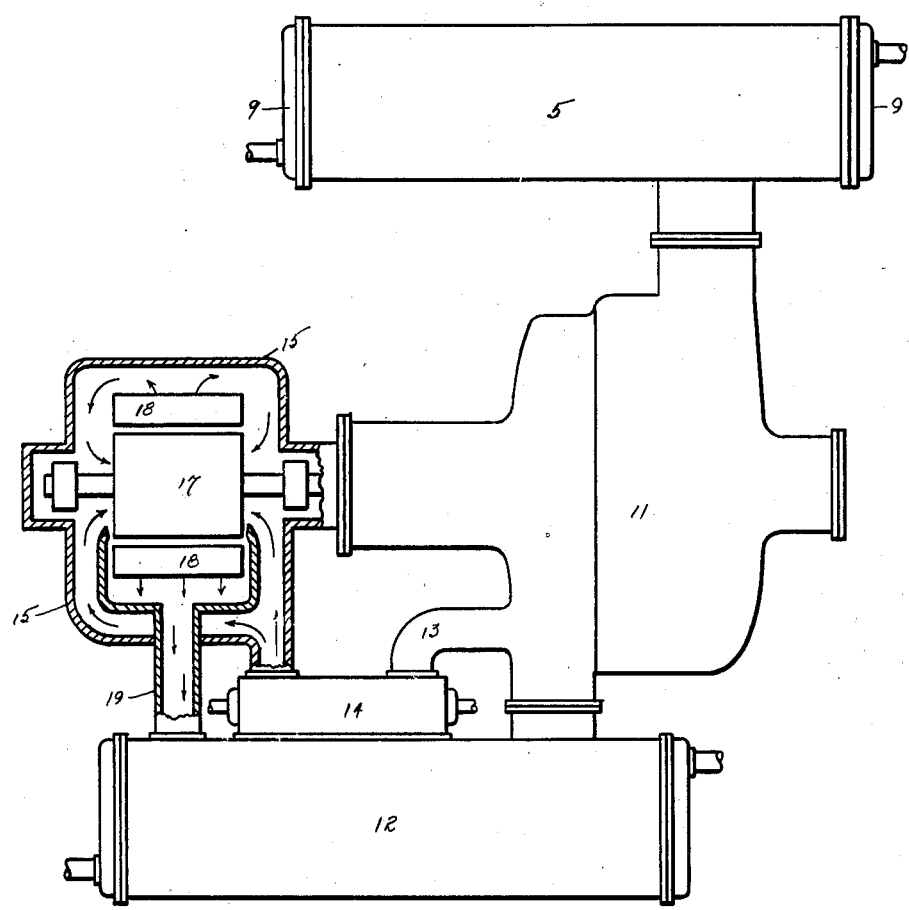
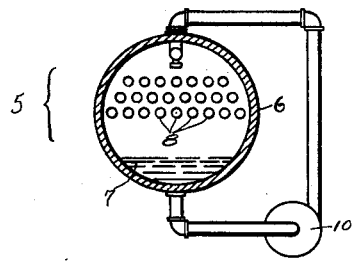
INVENTOR.
Willis H. Carrier & Robert W. Waterfill
BY
ATTORNEY Patented May 19, 1936

2,041,045

UNITED STATES PATENT OFFICE 2,041,045

REFRIGERATION

Willis H. Carrier, Elizabeth, and Robert W. Waterfill, East Orange, N. J., assignors, by mesne assignments, to Carrier Engineering Corporation, Newark, N. J., a corporation of New York Application October 27, 1933, Serial No. 695,394

3 Claims. (Cl. 62—178)

This invention relates to refrigerants, and more particularly to a process in which a refrigerant is used in combination with a centrifugal compressor for absorbing and dissipating heat at widely differing temperatures.

The invention, generally, relates to the practical employment of a substance in a centrifugal refrigerating machine, whereby great advantage in efficient production of refrigerating effect is achieved over that now attainable with known refrigerants.

Many substances, such as ammonia, carbon dioxide, carbon tetrachloride, sulphur dioxide, and others, have for many years been known and used as refrigerants. All of them, however, have objectionable properties which make their use in refrigeration often undesirable. Because of their toxic, combustible and explosive characteristics, their use, for example, in fields of air conditioning for human comfort is fraught with danger. Furthermore, their physical and chemical properties mitigate against their efficient and economical use in many instances where refrigeration is required. Thus, ammonia may be used only at relatively high pressures, requiring cumbersome compressors, piping, etc.; and its corrosive tendencies and toxic properties make it highly undesirable for use in air conditioning work. Similarly, carbon dioxide, although safer than ammonia, develops exceedingly high pressures. Similar disadvantages mitigate against the use of sulphur dioxide and carbon tetrachloride. In other words, refrigerants such as these, long known in the refrigeration field, have physical and chemical properties which make them undesirable in certain types of work because of their dangerous characteristics, or because they are only suited for use in certain types of machines.

Applicants are particularly concerned with a refrigerant capable of efficient use in a centrifugal compressor; and applicants' object was to find a refrigerant which embraced none of the disadvantages, from the standpoint of safety and mechanical efficiency, possessed by said refrigerants. As may be noted in Patents Nos. 1,530,542, 1,642,942, 1,642,943 and 1,781,051, of coapplicant Carrier, the search for efficient and safe refrigerants capable of economical use with centrifugal refrigerating compressors, has produced refrigerants now practically employed in commercial refrigeration. The patents referred to, of coapplicant Carrier, cover his practical development and employment in the field of centrifugal refrigeration of the refrigerants dichloroethylene and dichloromethane, called respectively Dielene and Carrene in the commercial refrigeration world. These refrigerants have for some years been successfully used with centrifugal compressors.

The present invention provides a refrigerant which has the advantages of Dielene and Carrene but provides for more efficient and economical operation over a wider range of temperatures. Its physical and chemical properties enable its use with a centrifugal compressor which is relatively smaller in size, more compact, and contains fewer stages, yet produces equal or greater refrigerating effect than is obtained with Dielene or Carrene. This new refrigerant is trichlorofluoromethane ($CFCl_3$). When used in substantially a chemically pure state, it is inert to the materials of the refrigerating system. One of its great advantages resides in its high vapor density at relatively low operating pressures. Thus, to produce a desired refrigerating effect, the compressor may be much smaller and have fewer stages than that required for use with former known refrigerants. It is non-combustible, both in vaporous and liquid state and is nonexplosive in any mixture with air. At normal atmospheric temperature (72° F.) and pressure (30" barometer), it remains in liquid form.

Its characteristics enable it to be used in a centrifugal machine over a wide range of temperatures. While, with Carrene, for example, the temperature in the evaporator rarely exceeds 60 degrees F. below that of the temperature of the condenser water employed, with trichlorofluoromethane, it is possible to obtain temperatures 120 degrees less than that of the condenser water with a compressor having the same number of stages operated at the same speeds. Thus, with this new refrigerant, the range of temperatures may extend, for purposes of illustration, from minus 25 degrees to 95 degrees, and temperatures below minus 25 degrees F. may be attained, depending upon the temperature of condenser water employed for carrying out the refrigeration cycle.

Trichlorofluoromethane is nearly four and a half times as heavy as air under like temperature and pressure conditions, and because of its large volume and high specific weight, is mechanically well adapted for use in a centrifugal compressor.

Because of its advantages in physical and chemical characteristics over present refrigerants, it can accomplish with a fewer number of stages, and in a smaller compact compressor of good mechanical proportions, the equivalent in refrigerating effect which heretofore required larger machines and a greater number of stages of compression.

In practical use, with a centrifugal compressor, the pressure in the evaporator is below atmospheric pressure, while the pressure in the condenser will be substantially at atmospheric pressure, and hence, the pressure differences in the system, for example that shown in the accompanying drawing, are low.

Considering the drawing, Fig. 1 is a plan view, partly in section, of a refrigerating device adapted to carry out a refrigerating process employing applicants' new chemical compound, and Fig. 2 is an elevation, partly in section, of the evaporator of Fig. 1, showing the refrigerant circulating system.

Numeral 5 designates an evaporator comprising a shell 6, the lower part of which forms a reservoir for refrigerant 7 and a series of tubes 8 passing through shell 6. Heads 9, on the ends of shell 6, form suitable manifolds for the distribution of a fluid such as water or brine to the interior of tubes 8. Pump 10 is adapted to withdraw refrigerant from the base of shell 6 and to spray the liquid over the surfaces of tubes 8. The refrigerant, in passing over the tubes, absorbs heat from the water or other medium contained therein, thereby cooling it. Centrifugal compressor 11 is adapted to withdraw the resulting vapor from the evaporator to compress it and discharge the compressed vapor into condenser 12, wherein it is liquefied and then returned to the base of shell 6. Condenser 12 may be of any desired construction, although a shell and tube condenser, similar in construction to the above described evaporator, is preferred. In the embodiment shown in Fig. 1, the compressor and motor are totally enclosed; and the motor is cooled by the circulation of a portion of the refrigerant vapors through and in contact with the motor windings. To this end, a portion of the compressed gas is discharged through conduit 13 into a gas cooler 14, of desired construction, the gas, for example, flowing on the outside of the tubes within the cooler, while a cooling liquid flows through the tubes. The cooled gas from 14 is discharged into motor casing 15, where it contacts and cools the armature 17 and windings 18. A conduit 19 conveys the warm gas into condenser 12, wherein it is condensed and from which it may be returned to the evaporator for use in the refrigerant cycle. The vapors from compressor 11 which do not pass to cooler 14, enter condenser 12 through conduit 16, and, after liquefaction, are returned to the evaporator, again to be used in the refrigeration cycle.

Due to its great density, trichlorofluoromethane is peculiarly adapted for use in an arrangement such as is illustrated in Fig. 1, since but a relatively small volume of the gas, as compared with the volume of air or other gas, is required to effect the necessary cooling of the motor.

For the purpose of removing air and other non-condensible gases from a system of the character described, some type of purge is employed. When the refrigerant employed (Carrene or Dielene, for example) is condensed at less than atmospheric pressure, it is necessary to supply a pump for increasing this pressure to a point above atmospheric. With dichlorofluoromethane, however, the condensing pressure is slightly greater than atmospheric. Therefore, when this refrigerant is used, a pump-type purge may be dispensed with, and in its place, a simple, inexpensive pressure purge substituted. Thus, substantially all of the advantages accruing from the use of sub-atmospheric pressures are obtained, whereas some of the difficulties heretofore encountered with prior known refrigerants, are obviated.

Applicants have discovered and adapted for practical use a chemical whose characteristics, including high specific density, large specific gas volume, low pressure differences, low vapor pressures, non-inflammability, non-toxicity, and chemical inactivity, among others, clearly indicate that it is a superior refrigerant. Its properties, enabling efficient and economical use with centrifugal machines capable of producing equivalent refrigerating effect, with smaller and fewer stages than now required with known refrigerants, provide an eminent advance in the field of centrifugal refrigeration.

We claim:

1. A process of refrigeration which comprises circulating trichlorofluoromethane through an evaporator over evaporating surfaces therein, to cause evaporation of the trichlorofluoromethane and compressing the resultant vapors by centrifugal movement thereof at a speed sufficient to enable the vapors to be condensed at a temperature as great as 120° above the temperature of the film on the evaporating surfaces but at a pressure not materially greater than one atmosphere.

2. A process of refrigeration which comprises circulating trichlorofluoromethane as a film over evaporating surfaces in quantities greater than can be evaporated on said surfaces, causing evaporation of said film at a pressure less than one atmosphere and at a temperature ranging from 55° F. to −30° F., and condensing and returning to circulation the evaporated trichlorofluoromethane vapors.

3. A process of refrigeration which comprises circulating trichlorofluoromethane through an evaporator over evaporating surfaces therein, creating a partial vacuum within said evaporator to cause evaporation of the tricholorofluoromethane, centrifugally compressing and then condensing the evaporated trichlorofluoromethane and returning to circulation the resultant condensate, the difference between the pressures at the points of evaporation and condensation not exceeding twenty pounds.

WILLIS H. CARRIER.
ROBERT W. WATERFILL.